US005690713A

United States Patent [19]

Bowerman et al.

[11] Patent Number: 5,690,713

[45] Date of Patent: Nov. 25, 1997

[54] FILTER AND ACCESSORY MOUNT FOR UPRIGHT VACUUM CLEANER EXHAUST PORT

[75] Inventors: Leonard E. Bowerman, Abingdon, Va.; Jeffrey P. Chandler, Blountville; Peter Hoekstra, Bristol, both of Tenn.; Michael J. Kowalski, Bristol, Va.; Carla B. Rogers, Kingsport, Tenn.

[73] Assignee: Electrolux Corporation, Atlanta, Ga.

[21] Appl. No.: 786,290

[22] Filed: Jan. 22, 1997

Related U.S. Application Data

[62] Division of Ser. No. 527,696, Sep. 13, 1995.

[51] Int. Cl.[6] .......... B01D 35/02

[52] U.S. Cl. .......... 55/490; 15/350; 55/501; 55/502; 55/503; 55/DIG. 3

[58] Field of Search .......... 55/490, 511, 501–503, 55/527, 528, DIG. 2, DIG. 3; 96/60–63; 15/347, 350, 352

[56] References Cited

U.S. PATENT DOCUMENTS

| | | | |
|---|---|---|---|
| 2,272,394 | 2/1942 | Armstrong | 55/364 |
| 2,335,428 | 11/1943 | Lofgren | 55/467 |
| 3,076,303 | 2/1963 | Durgeloh | 55/511 |
| 3,161,491 | 12/1964 | Gongoll et al. | 55/502 |
| 3,550,182 | 12/1970 | Kivela | 15/323 |
| 3,588,944 | 6/1971 | Fromknecht et al. | 15/327 |
| 3,614,860 | 10/1971 | Grellsson | 55/276 |
| 3,634,905 | 1/1972 | Boyd | 15/350 |
| 3,782,083 | 1/1974 | Rosenberg | 55/491 |
| 3,881,250 | 5/1975 | Frederickson | 30/383 |
| 3,932,153 | 1/1976 | Byrns | 55/511 |
| 3,950,157 | 4/1976 | Matney | 55/490 |
| 3,971,643 | 7/1976 | Hufton | 55/372 |
| 4,342,133 | 8/1982 | Minton | 15/339 |
| 4,554,701 | 11/1985 | Van Raaij | 15/340 |
| 4,657,570 | 4/1987 | Gronholz et al. | 55/511 X |
| 4,670,937 | 6/1987 | Sumerau et al. | 15/329 |
| 4,745,654 | 5/1988 | Yamamoto et al. | 15/344 |
| 4,828,694 | 5/1989 | Leason | 210/168 |
| 4,831,685 | 5/1989 | Bosyj et al. | 15/344 |
| 5,011,555 | 4/1991 | Sager | 156/73.1 |
| 5,049,274 | 9/1991 | Leason et al. | 210/445 |
| 5,069,696 | 12/1991 | Bruno, III | 55/476 |
| 5,248,323 | 9/1993 | Stevenson | 95/90 |
| 5,269,917 | 12/1993 | Stankowski | 210/232 |
| 5,464,461 | 11/1995 | Whitson et al. | 55/503 X |

OTHER PUBLICATIONS

Iona Appliances Inc., FANTOM® Owner's Manual (with HEPA Absolute Air Filter addendum), 1994.

Lindhaus U.S.A., DP–5™ Upright Carpet Vacuum, "Features and Advantages," 1993.

Lindhaus U.S.A., DP–5™ Upright Carpet Vacuum sales sheet, 1993.

Lindhaus U.S.A., DP–5 Vacuum Cleaner Owner's Guide and Parts Manual, undated.

The Scott Fetzer Company, Kirby® Generation 3™ Owner's Manual, 1989.

*Primary Examiner*—Richard L. Chiesa
*Attorney, Agent, or Firm*—Fish & Neave; Jeffrey H. Ingerman

[57] ABSTRACT

A secondary air filter assembly that can be attached to the exhaust port of an upright vacuum cleaner is provided. The assembly includes an adapter plate that is adhered, clipped or otherwise affixed to the exhaust port, and a filter carrier that is removably attached to the base. The filter is preferably affixed as a unit to the filter carrier so that the entire filter/carrier unit can be replaced at once. The adapter base can also be used as an attachment for other accessories.

14 Claims, 10 Drawing Sheets

FIG.6
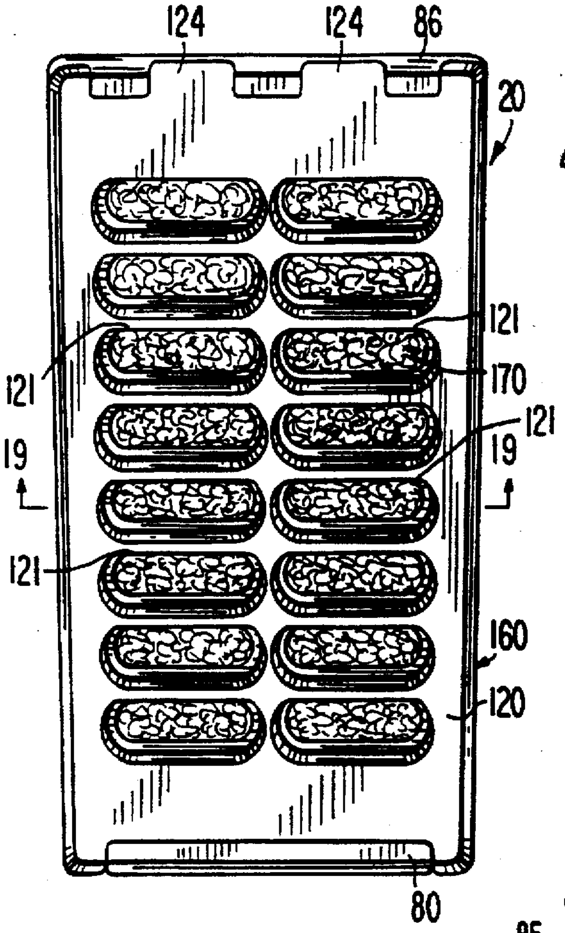
FIG.7
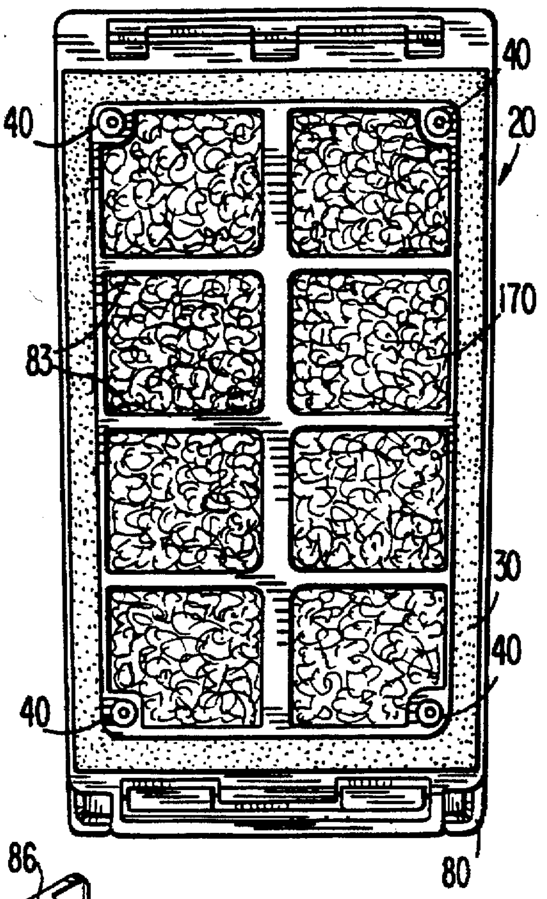
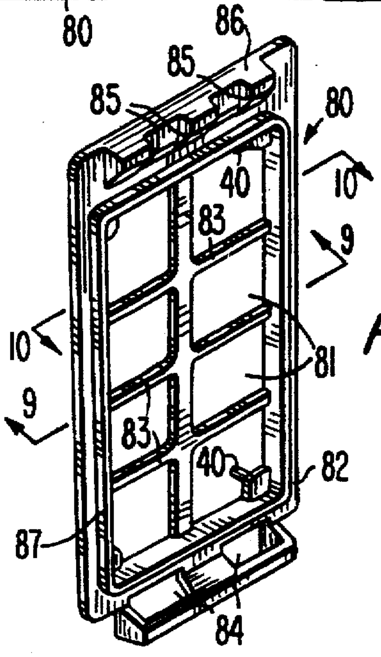
FIG.8

FIG.9
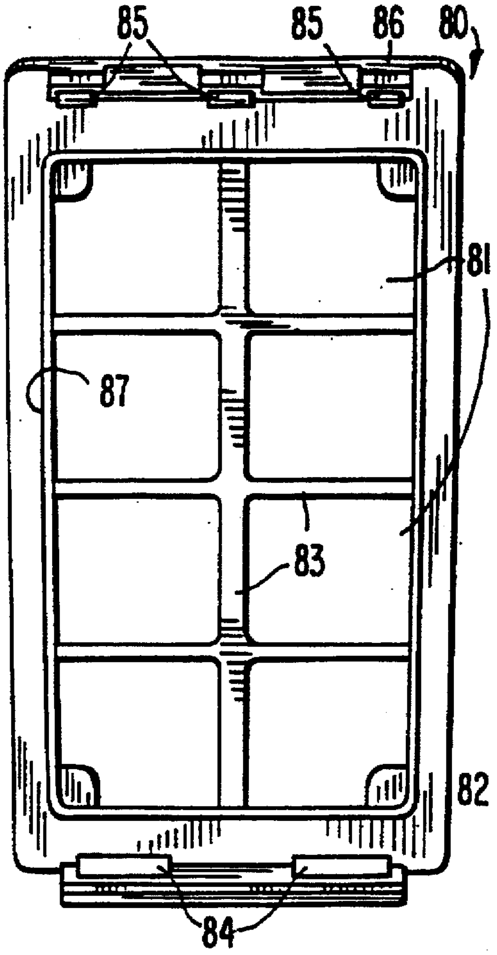
FIG.10
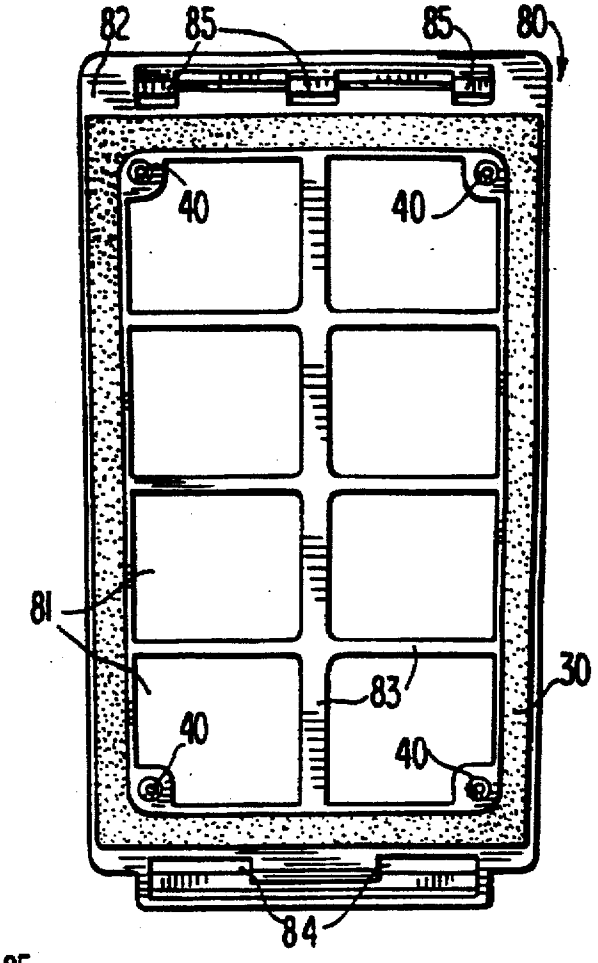
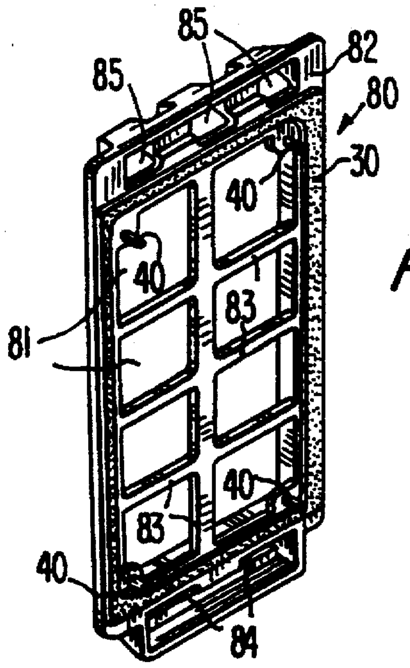
FIG.11

FIG. 12
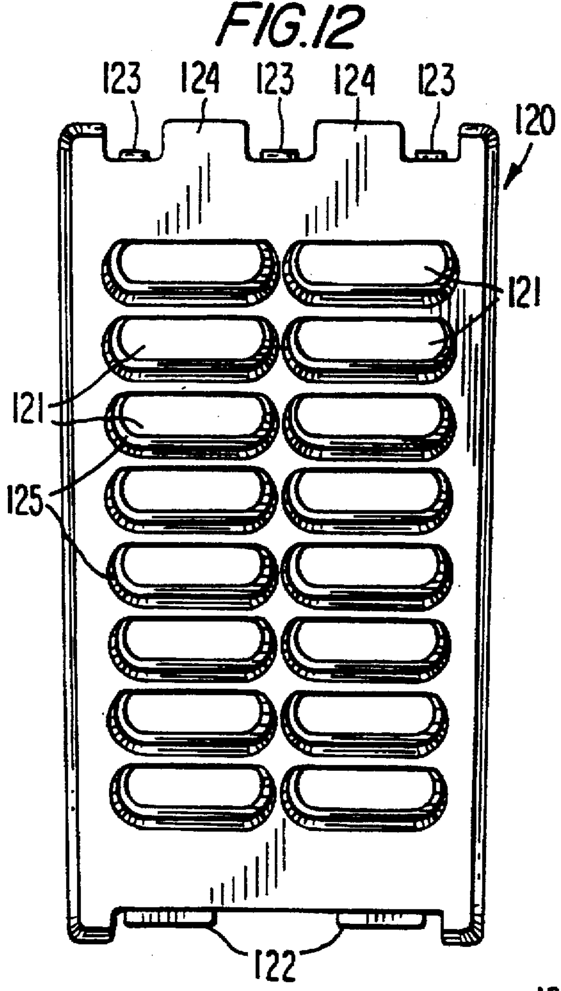
FIG. 13
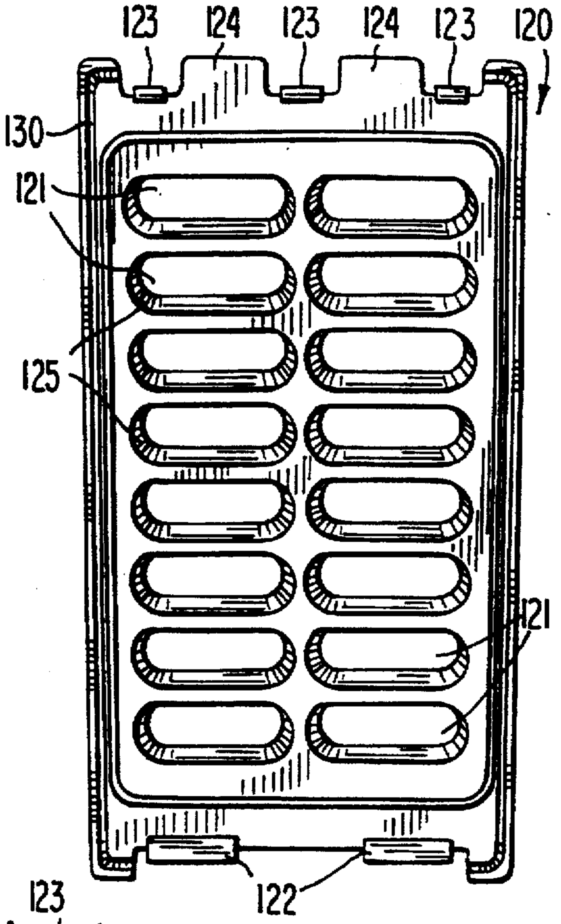
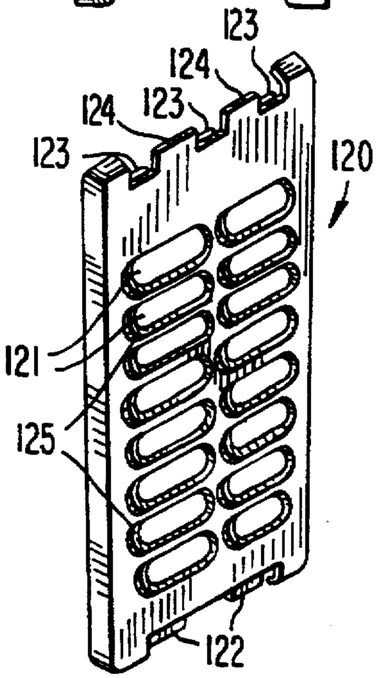
FIG. 14

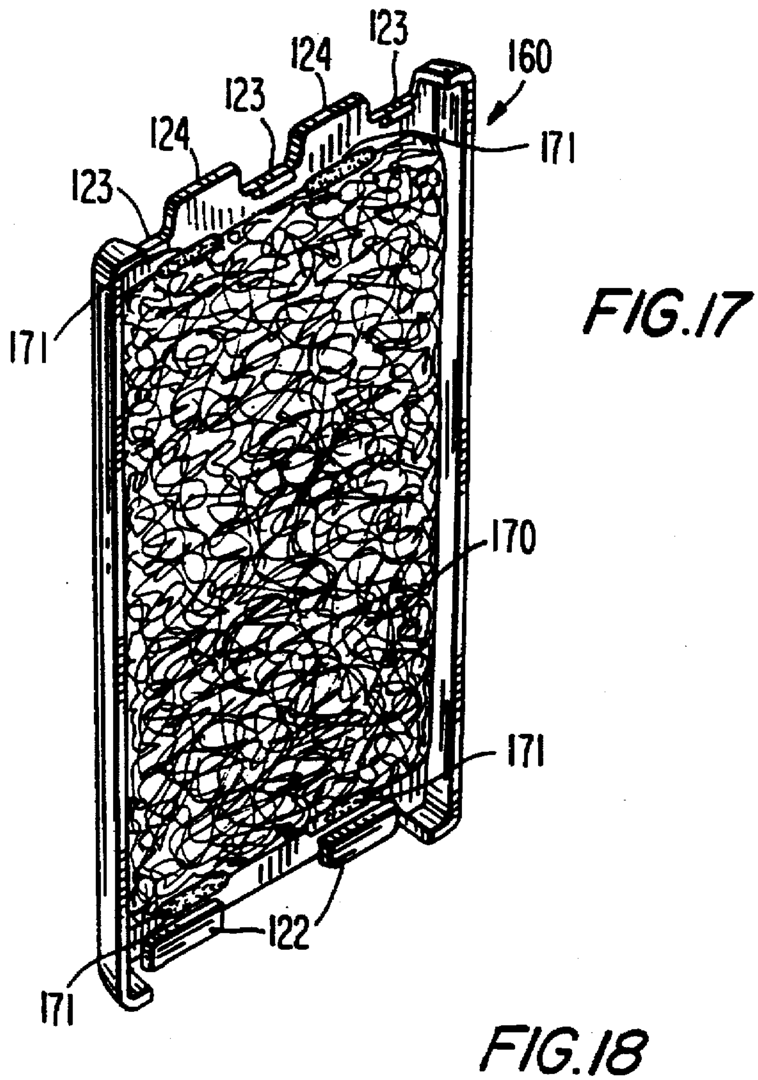
FIG. 17
FIG. 18
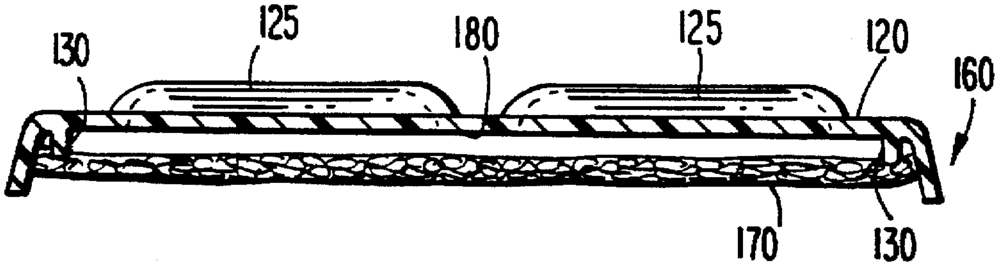
FIG. 19
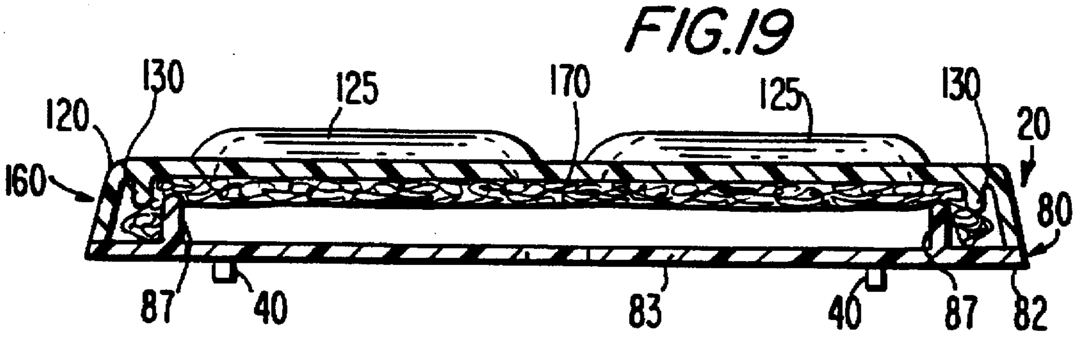

FILTER AND ACCESSORY MOUNT FOR UPRIGHT VACUUM CLEANER EXHAUST PORT

This is a division, of application Ser. No. 08/527,696, filed Sep. 13, 1995 entitled FILTER AND ACCESSORY MOUNT FOR UPRIGHT VACUUM CLEANER EXHAUST PORT.

BACKGROUND OF THE INVENTION

This invention relates to a secondary air filter for an upright vacuum cleaner. More particularly, this invention relates to a filter assembly, and a mount therefor, for attaching to the exhaust port of an upright vacuum cleaner.

In a vacuum cleaner, an electric motor drives a suction fan that draws in a stream of air laden with dust, dirt or other debris. The stream of air passes through a filter bag, which may be permanent and reusable or may be a single-use disposable bag, which traps the dust, dirt or debris. The vacuum cleaner may be a canister type, in which the motor, fan and filter bag are located in a housing connected by a hose to a cleaning tool through which air is drawn in. Alternatively, the vacuum cleaner may be the upright type, in which air is drawn in either through an opening on the body of the vacuum cleaner itself, which generally is moved along the floor, possibly on wheels, or through a hose. In "dirty air" systems, the fan is in the dirty air stream upstream of the filter bag, and the air is expelled from the fan into the filter bag. A separate cooling fan is provided which generates a separate flow of air for cooling the motor. In "clean air" systems, the fan is downstream of the filter bag, and the air being drawn by the fan passes through the filter bag before reaching the fan, so that the fan is in a clean air stream. The motor is cooled by the same air stream after it has passed through the filter bag. Most canister vacuum cleaners are of the "clean air" type, while upright vacuum cleaners may be of either type.

In both "clean air" and "dirty air" systems, substantially clean air is exhausted from the vacuum cleaner. However, the substantially clean exhaust air may still contain very fine dirt or dust, because the filter bag must be permeable to allow air to be exhausted. If the filter bag is not permeable enough, the fan will not be able to drive or draw air through it. Moreover, as the filter bag is used, the pores or openings become clogged with dirt and dust particles. If the filter bag when new would trap the finest dust particles, the pores would quickly become clogged to the point that the filter bag could no longer be used because the fan could not drive or draw sufficient air through it. Therefore, the filter bag is generally designed with slightly larger pores or openings than is desired, and as the pores or openings clog with use, the effective size of the pores decreases from the initial larger size to the desired size, and then to smaller sizes as the bag becomes full. As a result, throughout most or all of the useful life of a filter bag, the "clean" exhaust air actually contains very fine dust, ranging in size from less than one micron through tens of microns.

In addition, the motor that drives the suction fan has an armature that rotates and has a commutator that rotates with the armature and is contacted by brushes that transfer electric power to the rotating armature. As the commutator rotates, it causes wearing of the brushes, resulting in the release of fine particles of brush material into the airstream. Normally, the brushes are made from carbon, and thus carbon particles are released. In a clean air system, this release of motor brush particles occurs downstream of the filter bag, and thus there is nothing to stop the release of the motor brush particles through the exhaust port. Similarly, in a dirty air system, the motor brush particles are exhausted with the separate cooling air stream, which does not pass through the filter bag, so again there is nothing to stop the release of the motor brush particles.

Canister vacuum cleaners have generally, at least recently, had secondary filters, also known as "after filters," to filter the air stream after it exits the filter bag, to remove some of the fine particles, including motor brush particles. However, in general, upright vacuum cleaners have not had such secondary filters.

As set forth above, a canister vacuum cleaner has a hose that connects its suction port to one of a variety of tools. Frequently, it is also possible to connect the hose to the exhaust port. This may be useful if a source of air under pressure is needed—e.g., to blow leaves off one's driveway—or to drive an accessory designed to be attached to the hose, such as a hair dryer. In addition, it may be useful for clearing the hose of obstructions. Traditionally, upright vacuum cleaners have lacked such hoses, although more recently, upright vacuum cleaners have been made available that have adapters for suction hoses, which can accept various cleaning tools, and certain dirty air upright vacuum cleaners can accept hoses on their filter bag mounts. However, there has not heretofore been an upright vacuum cleaner of the clean air type that can accept hoses or accessories on its exhaust port, either directly or by use of an adapter.

It would be desirable to be able to provide a secondary air filter for an upright vacuum cleaner.

It would also be desirable to be able to provide such a secondary filter that can be easily replaced when clogged.

It would further be desirable to provide an adapter for a hose or accessories on the exhaust port of an upright vacuum cleaner of the clean air type.

SUMMARY OF THE INVENTION

It is an object of this invention to provide a secondary air filter for an upright vacuum cleaner.

It is also an object of this invention to provide such a secondary filter that can be easily replaced when clogged.

It is a further object of this invention to provide an adapter for a hose or accessories on the exhaust port of an upright vacuum cleaner of the clean air type.

In accordance with this invention, there is provided a secondary air filter assembly for an upright vacuum cleaner. The upright vacuum cleaner includes a body having an exhaust port for exit of air with which dirt is drawn into the vacuum cleaner, the air passing through a primary filter and depositing the dirt prior to exiting the exhaust port. The secondary air filter assembly includes a filter, a substantially rigid filter carrier, and a base for mounting on the body over the exhaust port. The base has at least one opening therein for the passage of exhaust air from the suction port through the base. The filter carrier has at least one opening therein for the passage of exhaust air therethrough. Each of the base and the filter carrier has complementary releasable engagement structure, for releasably attaching the filter carrier to the base. When the filter carrier is attached to the base, the filter is captured between the base and the filter carrier.

A vacuum cleaner including such a filter assembly is also provided, as is a vacuum cleaner including an exhaust port adapter for hoses, filters and other accessories. An exhaust port adapter is provided as well, as is a replacement filter unit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 is a front elevational view of the secondary air filter assembly of FIGS. 2–5;

FIG. 7 is a rear elevational view of the secondary air filter assembly of FIGS. 2–6;

FIG. 8 is a front perspective view of a preferred embodiment of the adapter plate of the secondary air filter assembly of FIGS. 2–7;

FIG. 9 is a front elevational view of the adapter plate of FIG. 8, taken from line 9—9 of FIG. 8;

FIG. 10 is a rear elevational view of the adapter plate of FIGS. 8 and 9, taken from line 10—10 of FIG. 8;

FIG. 11 is a rear perspective view of the adapter plate of FIGS. 8–10;

FIG. 12 is a front elevational view of a preferred embodiment of a filter carrier according to the invention;

FIG. 13 is a rear elevational view of the filter carrier of FIG. 12;

FIG. 14 is a front perspective view of the filter carrier of FIGS. 12 and 13;

FIG. 17 is a rear perspective view of the filter unit of FIG. 16;

FIG. 18 is a cross-sectional view of the filter unit of FIGS. 16 and 17, taken from line 18—18 of FIG. 16; and FIG. 19 is a cross-sectional view of the secondary air filter assembly of FIGS. 2–7, taken from line 19—19 of FIG. 6.

DETAILED DESCRIPTION OF THE INVENTION

Figure 1:
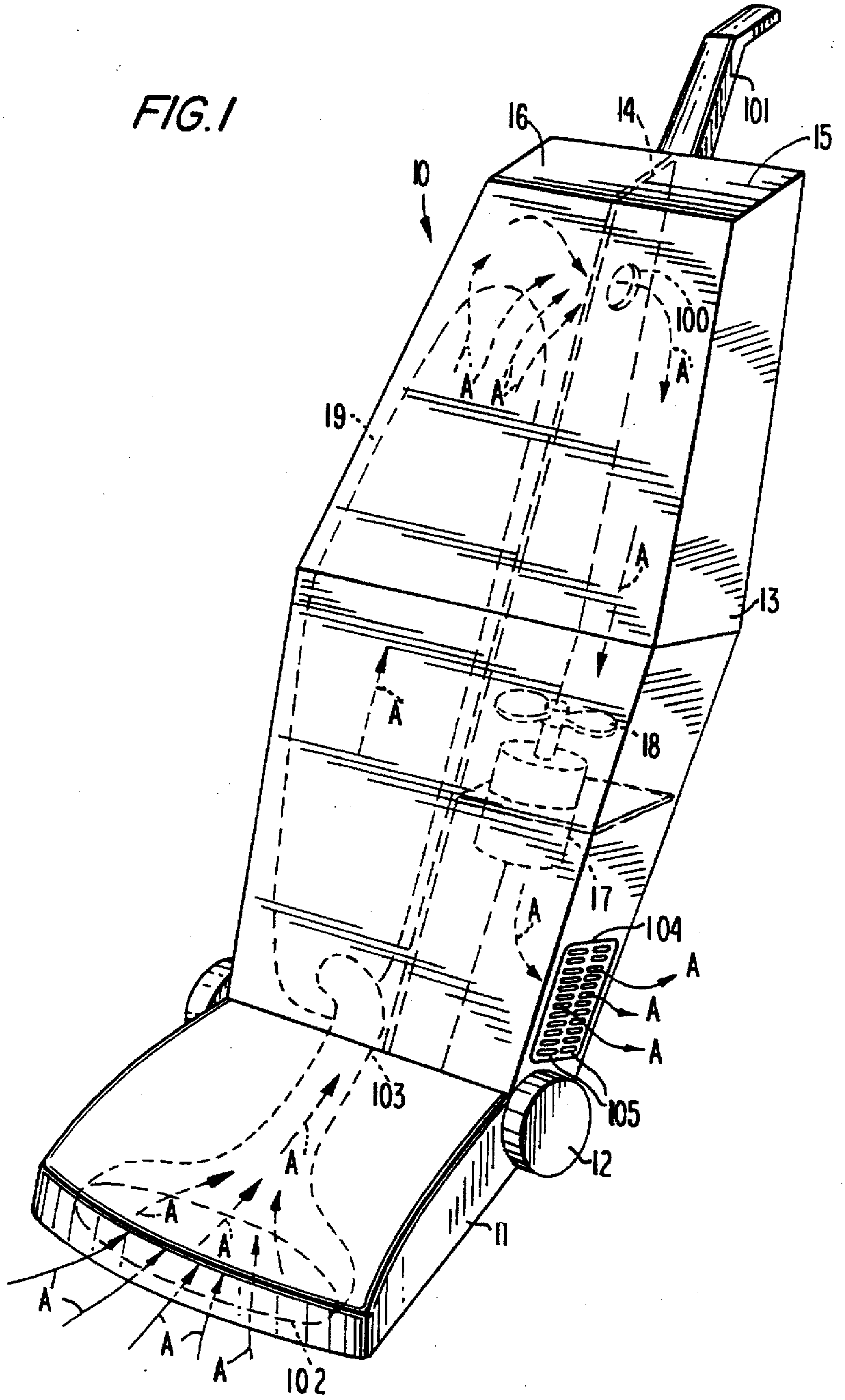
FIG. 1 is a schematic front perspective view of a vacuum cleaner with which the present invention can be used.
Figure 2:
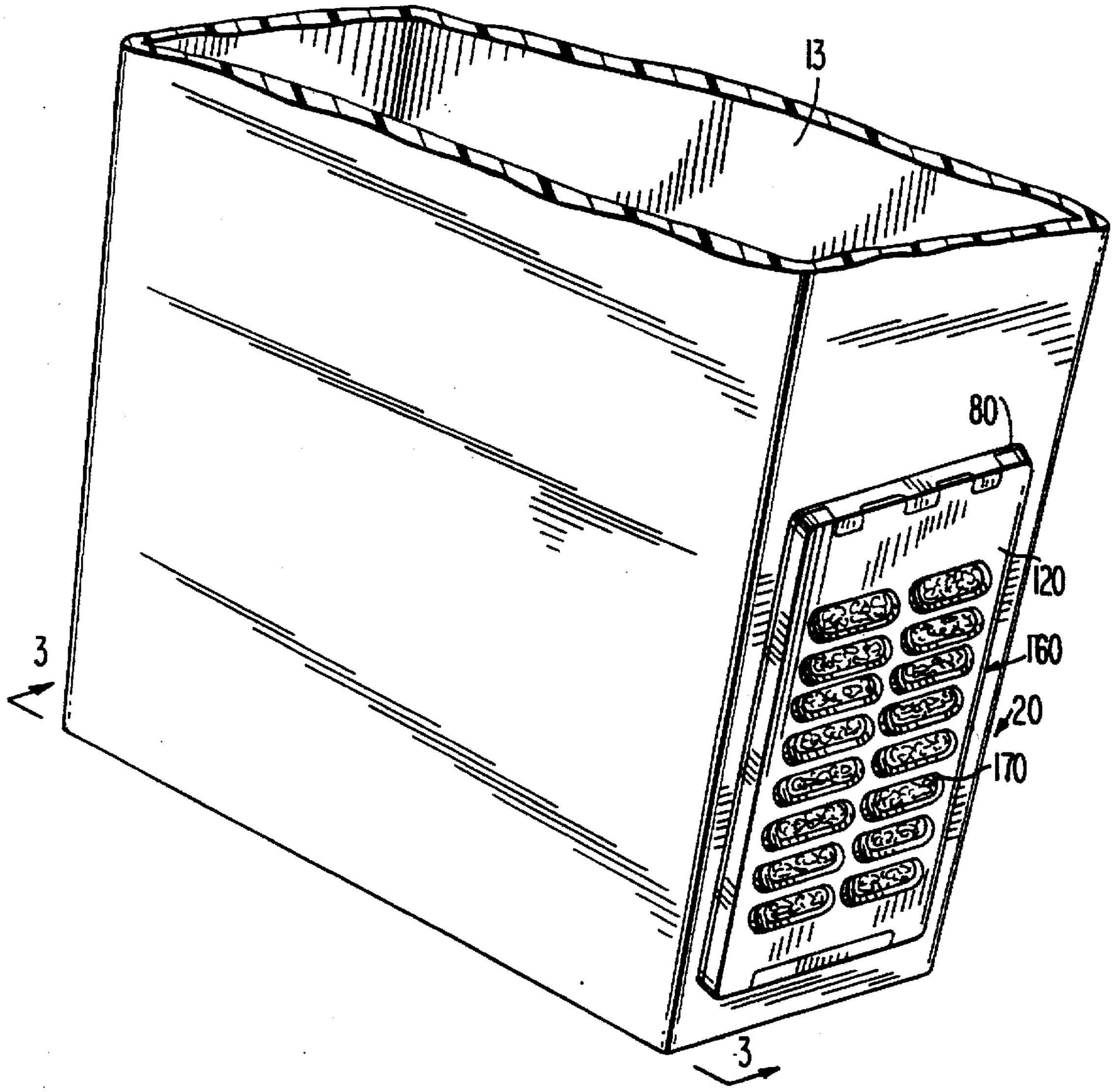
FIG. 2 is a fragmentary front perspective view of the body of the vacuum cleaner of FIG. 1, showing a front perspective view of a preferred embodiment of a secondary air filter assembly according to this invention.
Figure 3:
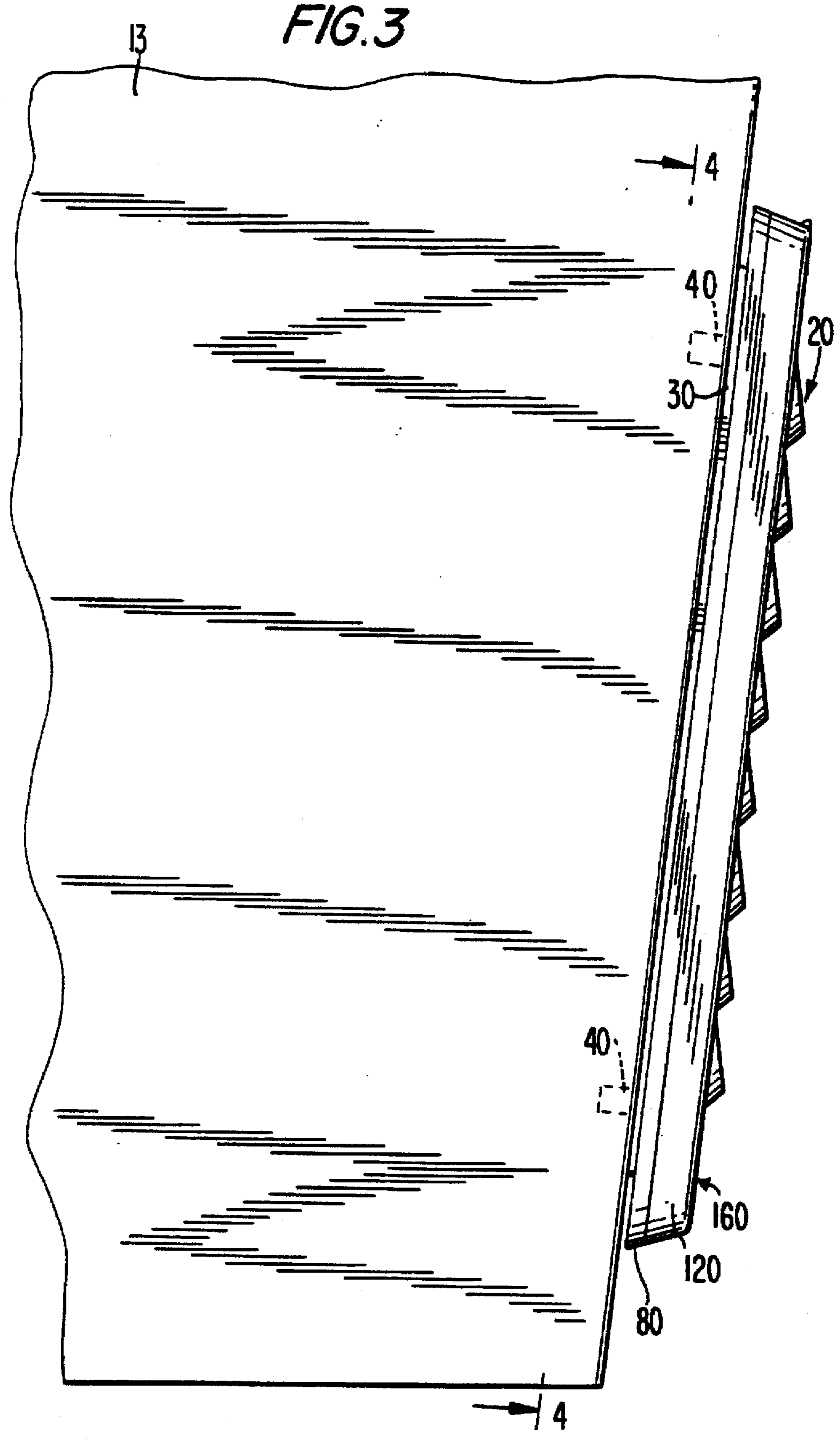
FIG. 3 is a fragmentary front elevational view, taken from line 3—3 of FIG. 2, of the vacuum cleaner body of FIG. 2, showing a side elevational view of the secondary air filter assembly of FIG. 2.

The present invention allows a secondary air filter to be attached to the exhaust port of a conventional upright vacuum cleaner, and includes the filter assembly for doing so, the adapter portion that allows the filter as well as other accessories to be attached, the filter unit itself, and the vacuum cleaner so equipped. The secondary air filter assembly of the invention may be sold as an aftermarket accessory for upright vacuum cleaners that are initially sold without secondary air filters. In addition, the secondary air filter assembly may be attached to new vacuum cleaners in the factory. Alternatively, to reduce manufacturing costs, the secondary air filter assembly can be packaged with new vacuum cleaners for attachment by the retailer before or upon sale, or for attachment by the consumer after purchase.

As used herein, the term "secondary air filter" refers to any filter in a vacuum cleaner other than the primary filter (such as the filter bag) that removes the majority of dust and dirt from the air stream. The use of the term "secondary" to describe a filter is not meant to imply that air passing through that filter passes first through another filter, or that the air has not already passed through more than one filter. For example, a filter on the cooling air stream of a dirty air vacuum cleaner, for catching carbon brush particles, would be considered a secondary filter even though it is the only filter in that air stream. Similarly, even if an intermediate filter is provided between the filter bag and the exhaust port filter, so that the exhaust port filter is the third filter in that air stream, it would still be considered a "secondary" filter (as would the intermediate filter).

As an attachment that may be installed in the field, and in particular by a consumer, the structure of the present invention should preferably be easy to align properly. The attachment also preferably should provide a substantially foolproof attaching scheme that is strong, so as not to be blown off by the exhaust air stream, and that seals substantially completely around the edges of the exhaust port, to prevent exhaust air from escaping between the vacuum cleaner body and the attachment (a phenomenon known as "bypass"), particularly when the attachment is used for a filter for filtering the exhaust air. Finally, the replaceable filter portion should preferably have a substantially foolproof seal so that when it is replaced by a consumer, air does not escape within the attachment around the filter.

The present invention uses an adapter base that is attached to the exhaust port. (In a dirty air system, it can be attached to the exhaust port for the main air stream or the exhaust port for the cooling air stream, although the latter is not normally as strong as the former.) The attachment can be made by projections having lips that engage the edges of the exhaust port opening or openings, with a seal provided by a gasket of resilient material, such as a rubber material or a closed-cell foam, between the adapter base and the vacuum cleaner body around the outside of the exhaust port. However, the attachment and seal are preferably accomplished simultaneously by providing a gasket of double-sided closed-cell foam adhesive tape. Such tapes are known for their strong adhesion, which is aided by both the type of adhesive used in such tapes and the compliant nature of the foam substrate, which allows the adhesive layers to intimately follow and engage the surfaces to which they are being applied. Even if adhesive attachment is used, however, projections preferably are provided to engage the edges of the exhaust port opening or openings so that the adapter base can be properly aligned with the exhaust port.

The adapter base fits over the exhaust port, and has one or more openings that allow the exhaust air to pass. A filter unit, including a substantially rigid filter carrier and the filter itself, can be attached to the adapter base, preferably by means of interengaging tabs and slots, with appropriate lips on at least some of the tabs for lockingly engaging the edges of corresponding slots. The filter carrier also has openings through which the filtered exhaust air may pass, and deflector structure to direct the exhausted filtered air in a desired direction (e.g., away from the surface being cleaned, to avoid moving dust and dirt around on that surface).

To ensure a proper seal between the filter unit and the adapter base, the filter preferably is at least partially affixed to the filter carrier, so that it engages the adapter base with a predetermined alignment. Most preferably, the filter is tacked down at select positions along its edges, to reduce manufacturing costs while still assuring proper alignment with the sealing portions of the filter assembly.

Those sealing portions include a first rib on the adapter base, extending at least substantially continuously around the adapter base at a location outside the at least one opening in the adapter base—i.e., at a location selected to ensure that the rib is outside all of the openings provided in the base for passage of air exiting the exhaust port, regardless of the number of those openings. The rib protrudes from the adapter base toward the filter carrier when the filter carrier is mounted on the adapter base.

The sealing portions also include a similar rib on the filter carrier, extending at least substantially continuously around the filter carrier at a location outside the at least one opening in the filter carrier—i.e., at a location selected to ensure that the rib is outside all of the openings provided in the filter carrier for passage of air exiting the exhaust port, regardless of the number of those openings. The rib protrudes from the filter carrier toward the adapter base when the adapter base is mounted on the filter carrier.

The two sealing ribs are located so that they are not coincident, but rather are parallel to one another, separated by a relatively small separation distance. Preferably, the rib on the adapter base is within the area bounded by the rib on the filter carrier, although the opposite arrangement is also possible. A seal between the filter material, the filter carrier and the base is effected by the capture of the filter material in a tortuous path between the ribs.

Each rib has a respective height that is less than the plate gap distance between the respective flat plate portions of the base and the carrier, so that the base rib does not touch the carrier, nor does the carrier rib touch the base. The gap amount by which the rib heights are less than the plate gap distance is at least equal to the compressed thickness of the filter material carried by the filter carrier; otherwise the-base, the carrier, or both may become deformed as one attempts to engage the carrier to the base, which may affect the seal between them and allow bypass air to flow. For whichever of the two ribs is closer to the airflow openings in the base and the carrier, the gap amount is preferably substantially equal to the compressed thickness of the filter material; if the gap amount were significantly greater than the compressed thickness, the possibility of a bypass flow through the tortuous path would increase. For the rib further from the airflow openings, however, it is acceptable for the gap amount to be at least somewhat greater than the compressed thickness, as long as that rib is tall enough to turn the filter material into the tortuous path.

The separation distance between the two ribs—i.e., in the plane parallel to the flat plate portions of the base and the carrier—should be at least equal to the compressed thickness of the filter material, and may be somewhat greater as long as the ribs are close enough together to turn the filter material into a tortuous path. That, of course, also depends on there being sufficient filter material to turn into a tortuous path. In order for the filter material to be turned into a tortuous path, the filter material preferably extends beyond the rib that is closer to the airflow openings by an excess amount at least equal to one half of the height of the rib closer to the airflow openings, and preferably at least about equal to the height of the rib closer to the airflow opening.

For an embodiment in which the carrier rib is closer to the airflow openings, the filter material should extend beyond the carrier rib by the excess amount just defined. In the preferred embodiment, however, the base rib is closer to the airflow openings than is the carrier rib. Therefore, as long as the filter material affixed to the filter carrier extends beyond the carrier rib by more than an insignificant amount, and the filter is not stretched too tightly across the carrier, there would most likely be sufficient filter material to be turned into the tortuous path.

The filter medium itself can be any suitable filter medium for trapping particles of the size needed to be trapped. It is preferred that the filter medium be a synthetic material, and that the filter carrier be a plastic material, with the two materials capable of being ultrasonically Welded to one another.

A particularly preferred filter medium for trapping particles of the size to be trapped is an electrostatic filter, preferably a lofty mixed-fiber type of filter that traps particles by virtue of the electrostatic forces resulting from the presence of two types of fibers. A particularly preferred filter medium includes polypropylene fibers and modacrylic fibers.

Preferred embodiments of the invention will now be described with reference to FIGS. 1–19.

An upright vacuum cleaner of a type with which the present invention can be used is shown schematically in FIG. 1. Vacuum cleaner 10 has a suction base 11 which rolls on wheels 12 (only one shown). Body 13 is preferably pivotably connected (pivotable connection not shown) to base 11. A partition 14 divides body 13 into a motor chamber 15, and a bag chamber 16. Motor chamber 15 houses suction motor 17 which drives suction fan 18. Bag chamber 16 houses filter bag 19. An opening or passage 100 allows for fluid communication between chambers 15, 16. A handle 101 is provided to allow the user to manipulate vacuum cleaner 10. Vacuum cleaner 10 as shown is a clean air system, but the invention may also be used with dirty air systems.

In operation, motor 17 drives fan 18, creating suction that causes air to be drawn in through opening 102 in suction base 11. Dust and dirt are entrained in that air. The air flows in the path indicated by the arrows A, flowing through passage 103 into body 13 and filter bag 19. The air leaves filter bag 19 with most of the dust and dirt remaining in bag 19, and flows through passage 100 into motor chamber 15, whence it is exhausted through exhaust port 104, which may be a single opening (not shown), but is preferably made up of a plurality of openings 105.

Figure 16:
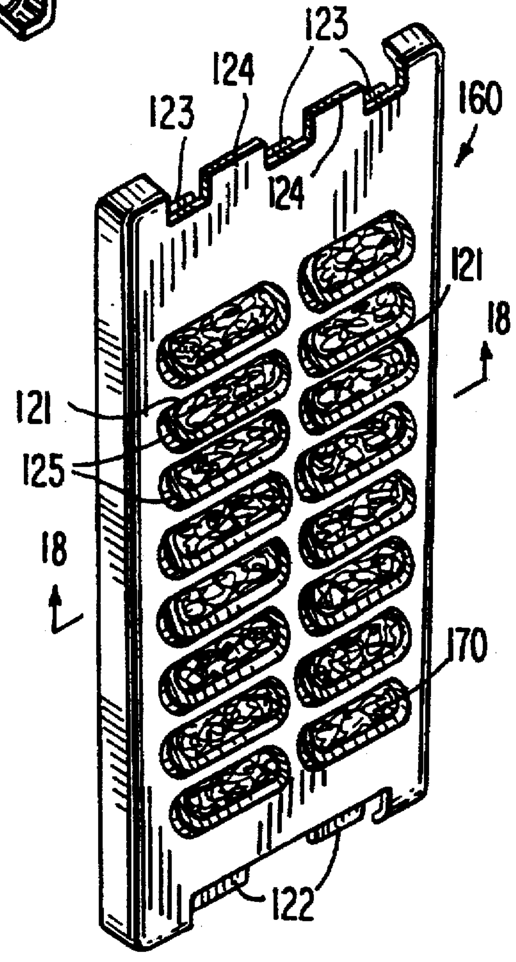
FIG. 16 is a front perspective view of a preferred embodiment of a filter unit according to the present invention.

In accordance with the present invention, a secondary air filter assembly, of which a preferred embodiment 20 is shown in FIGS. 2–7, is attached to exhaust port 104. Secondary air filter assembly 20 is made up of an adapter base 80 (FIGS. 8–11) and a filter unit 160 (FIGS. 16–18). Filter unit 160 is in turn made up of a filter carrier 120 (FIGS. 12–15) and a filter 170.

Adapter base 80 and filter carrier 120 preferably are made from a plastic material similar to that used for vacuum cleaner body 13, such as ABS plastic, polycarbonate, or any engineering thermoplastic, both for reasons of economy and so that the thermal response of adapter base 80 and filter carrier 120 are similar to that of vacuum cleaner body 13. Filter 170 is preferably made from a filter medium that can filter particles ranging in size from less than one micron ("sub-micron") through tens of microns, as discussed above. A preferred filter medium is a mixed-fiber filter medium which entraps particles by virtue of the electrostatic forces resulting from the presence of the dissimilar fibers. One such medium, which is particularly preferred, is a filter medium containing polypropylene fibers and modacrylic fibers, such as that sold under the name TECHNOSTAT® 250 by the Filtration Products Division of AFP Corporation, of Genoa, Ill. of course, single-fiber electrostatic media, as well as other media, may also be used. However, electrostatic filter media, which trap particles at least in part by electrostatic attraction rather than by mechanical efficiency, have a high filtration efficiency with low flow resistance.

Adapter base 80 is used to attach secondary air filter assembly 20 to vacuum cleaner body 13 over exhaust port 104. Once adapter base 80 is attached over exhaust port 104, exhaust air exiting exhaust port 104 passes through openings 81 in base plate 82 of adapter base 80. Although eight openings 81 are shown in the preferred embodiment, adapter base 80 may have as few as one opening 81, and may have as many openings 81 as desired. As a practical matter, the greater the number of openings 81 that are provided, the more exhaust flow area is covered by the struts 83 that separate openings 81. Therefore, preferably the number of openings 81 should not be so high that the exhaust flow area is obstructed to the point of interfering with the exhaust flow. Adapter plate 80 has pockets 84 and overhangs 85 for receiving attachment tabs of filter carrier 120 or other attachments as discussed below.

Filter carrier 120 has a plurality of exit openings 121 through which exhaust air can exit after passing through filter 170. The number of exit openings 121 may or may not correspond to the number of underlying openings 105 in exhaust port 104. Filter carrier 120 also has attachment tabs 122 for insertion into pockets 84, and lips 123 for engaging overhangs 85, for attaching filter carrier 120 to adapter base 80. Finger tabs 124 are provided to allow the user to unhook lips 123 from overhangs 85 to detach filter carrier 120 from adapter base 80—e.g., when filter replacement is required. For that purpose, finger tabs 124 preferably are sized to protrude beyond upper wall 86 of adapter base 80.

Preferably, each exit opening 121 of filter carrier 120 is provided with a deflector 125 to direct exhaust air upward, so that it does not disturb dirt or dust on the floor surface being cleaned. While deflectors 125 preferably are molded as part of filter carrier 120, they may be separate pieces (not shown) attached in any suitable manner to filter carrier 120.

Filter 170 is sandwiched between adapter base 80 and filter carrier 120. For ease of replacement, and for other reasons discussed below, filter 170 is preferably affixed to filter carrier 120, preferably by ultrasonic welds 171, to form filter unit 160. When filter 170 becomes clogged, the user merely unhooks spent filter unit 160 and inserts a new one, without having to touch the old, dirty filter, and without becoming concerned about the proper alignment of the new filter material, or about accidentally damaging the new filter material, etc.

It is desirable that all air that enters secondary air filter assembly 20 through openings 81 passes through filter 170. To that end, a sealing arrangement is provided comprising upstanding rib 87 on base plate 82 of adapter base 80 and upstanding rib 130 on carrier plate 180 (FIG. 18) of filter carrier 120. When filter carrier 120 is assembled to adapter base 80, rib 87 extends from base plate 82 toward Carrier plate 180, but does not reach carrier plate 180. Similarly, rib 130 extends from carrier plate 180 toward base plate 82, but does not reach base plate 82. Ribs 87, 130 do not touch one another. Instead, they are substantially parallel to one another, separated by a separation distance in a plane parallel to base plate 82 and carrier plate 180. In the preferred embodiment illustrated, rib 130 is outboard of rib 87.

The purpose of ribs 87, 130 is to provide a tortuous path for the edge of filter 170 which provides a seal against the escape of air. To that end, the gap between the extremity of rib 87 and carrier plate 180 when filter carrier 120 is assembled to adapter base 80 is substantially equal to the compressed thickness of the filter medium used for filter 170. Specifically, the preferred filter medium referred to above is lofty—i.e., it has loft, or resilience—but can be compressed, under a 2 ounce (57 gram) load applied by a pressure foot having a diameter of 1.129 inch (about 28.68 mm) to a thickness of about 0.130±0.020 inch (about 3.30±0.51 mm). Thus, the gap between the extremity of rib 87 and carrier plate 180 when filter carrier 120 is assembled to adapter base 80 is substantially equal to 0.130±0.020 inch (about 3.30±0.51 mm). If the gap is substantially smaller, secondary air filter assembly 20 will not be able to close properly, or will become deformed, potentially allowing unfiltered air to leak through. If the gap is substantially larger, air may leak through the gap.

For the same reasons, the gap between the extremity of rib 130 and base plate 82 when filter carrier 120 is assembled to adapter base 80 should be at least about the compressed thickness of the filter medium, to prevent deformation of secondary air filter assembly 20. However, the gap between the extremity of rib 130 and base plate 82 can be larger than the compressed thickness of the filter medium, because rib 130 is the second rib, further from the air flow. It is sufficient that that gap be small enough—i.e., that rib 130 be high enough—to turn filter 170 through the tortuous path formed by ribs 87, 130. For that reason, the height of rib 130 should be at least about one half the plate gap distance between base plate 82 and carrier plate 180.

Similarly, the preferred separation distance between ribs 87, 130 should be at least about equal to the compressed thickness of the filter medium, so that the tortuous path will be wide enough to accommodate the filter medium without deformation, but not so wide that the tortuous path is insufficiently tortuous to provide an effective air seal.

The tortuous path assures that air that enters secondary air filter assembly 20 will not leak out around filter 170. The compression of filter 170 by rib 87 preferably blocks most of the air flow, and the capture of filter 170 in the tortuous path assures that any air that may pass rib 87 is blocked.

In order to make sure that the tortuous path seal is effective, filter 170 must in fact be trapped in the tortuous path. It is for this reason that it is preferred that filter 170 be affixed to filter carrier 120, rather than being inserted separately by the consumer. Affixing filter 170 to filter carrier 120 assures that filter 170 is properly aligned with ribs 87, 130. In the preferred embodiment, filter 170 is merely tacked down, preferably by ultrasonic welding, at 171. However, filter 170 could be affixed to filter carrier 120 around its entire perimeter. Moreover, whether filter 170 is tacked down or affixed around its entire perimeter, ultrasonic welding is the preferred method of attachment, although adhesives or mechanical techniques could be used.

In the preferred embodiment, where rib 130 on filter carrier 120 is outboard of rib 87 on adapter base 80, it is sufficient that filter 170, as affixed to filter carrier 120, extends beyond rib 130. However, if rib 87 on adapter base 80 were outboard of rib 130 on filter carrier 120, then when filter 170 is affixed to filter carrier 120, care would have to be taken to assure that filter 170 extends beyond rib 130 by an amount sufficient to occupy the tortuous path between ribs 87, 130, as discussed above.

Even if substantially all air that enters secondary air filter assembly 20 is filtered by filter 170, secondary air filter assembly 20 is effective only if one also assures that substantially all air that exits exhaust port 104 enters secondary air filter assembly 20. To that end, secondary air filter assembly 20 is attached to vacuum cleaner body 13 with seal 30 between vacuum cleaner body 13 and secondary air filter assembly 20.

Preferably, seal 30 is a gasket of closed-cell foam. More preferably, the attachment of secondary air filter assembly 20 to vacuum cleaner body 13 is accomplished by using a double-sided closed-cell foam adhesive tape, and thus seal 30 most preferably is such a tape. Double-sided foam adhesive tapes are known to have high-tensile-strength adhesives, and the foam substrate allows the adhesive layers to conform intimately with the surfaces to which they are adhered, assuring a strong bond, which is necessary to maintain secondary air filter assembly 20 in place against the pressure and the temperature extremes of the exhaust air stream exiting exhaust port 104. A particularly preferred seal is made from a 1/32-inch thick (0.79375 mm thick) double-sided closed-cell foam adhesive tape available under the name STIK-II® #3332, from the STIK-II PRODUCTS division of the October Company, of Easthampton, Mass., which uses a heat-resistant acrylic-based adhesive.

Figure 4:
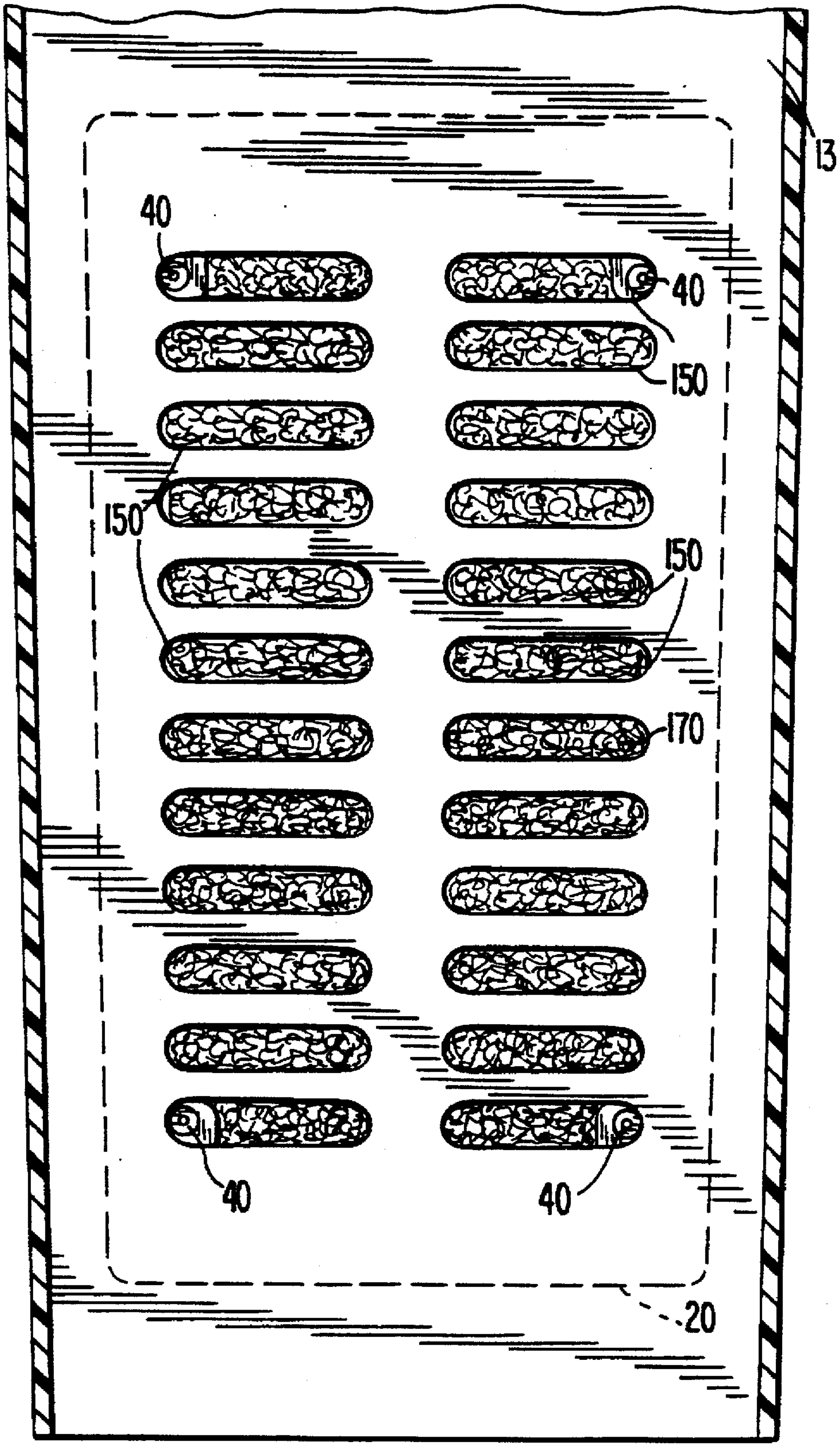
FIG. 4 is a fragmentary elevational view, taken from line 4—4 of FIG. 3, of the inside wall of the vacuum cleaner body of FIG. 2, showing the secondary air filter assembly of FIGS. 2 and 3 through openings in the wall.

Seal 30 is provided on adapter base 80 in the form of a gasket that, when adapter base 80 is properly aligned with exhaust port 104, fully surrounds exhaust port 104, so that no exhaust air can bypass secondary air filter assembly 20. To ensure alignment, adapter base 80 is preferably provided with four alignment fingers or pegs 40, located so as to engage edges of exhaust port 104 in only one possible orientation. As seen in FIG. 4, pegs 40 engage the outer extremities of the outermost openings 105 making up exhaust port 104. Even if exhaust port 104 were a single opening, pegs 40 could still engage the corners of that opening. In the embodiment shown, exhaust port 104 is trapezoidal, ensuring a unique orientation for pegs 40. If exhaust port 104 were rectangular or otherwise symmetrical, some other feature could be provided to ensure the correct orientation.

Alternatively, the adapter base could be attached to vacuum cleaner body 13 by other than a foam adhesive tape. For example, screws could be used. In that case, seal 30 might still be a closed-cell foam seal, which may or may not be affixed to the adapter base by adhesive. However, the seal could also be made from other materials, such as a suitable rubber material.

Figure 5:
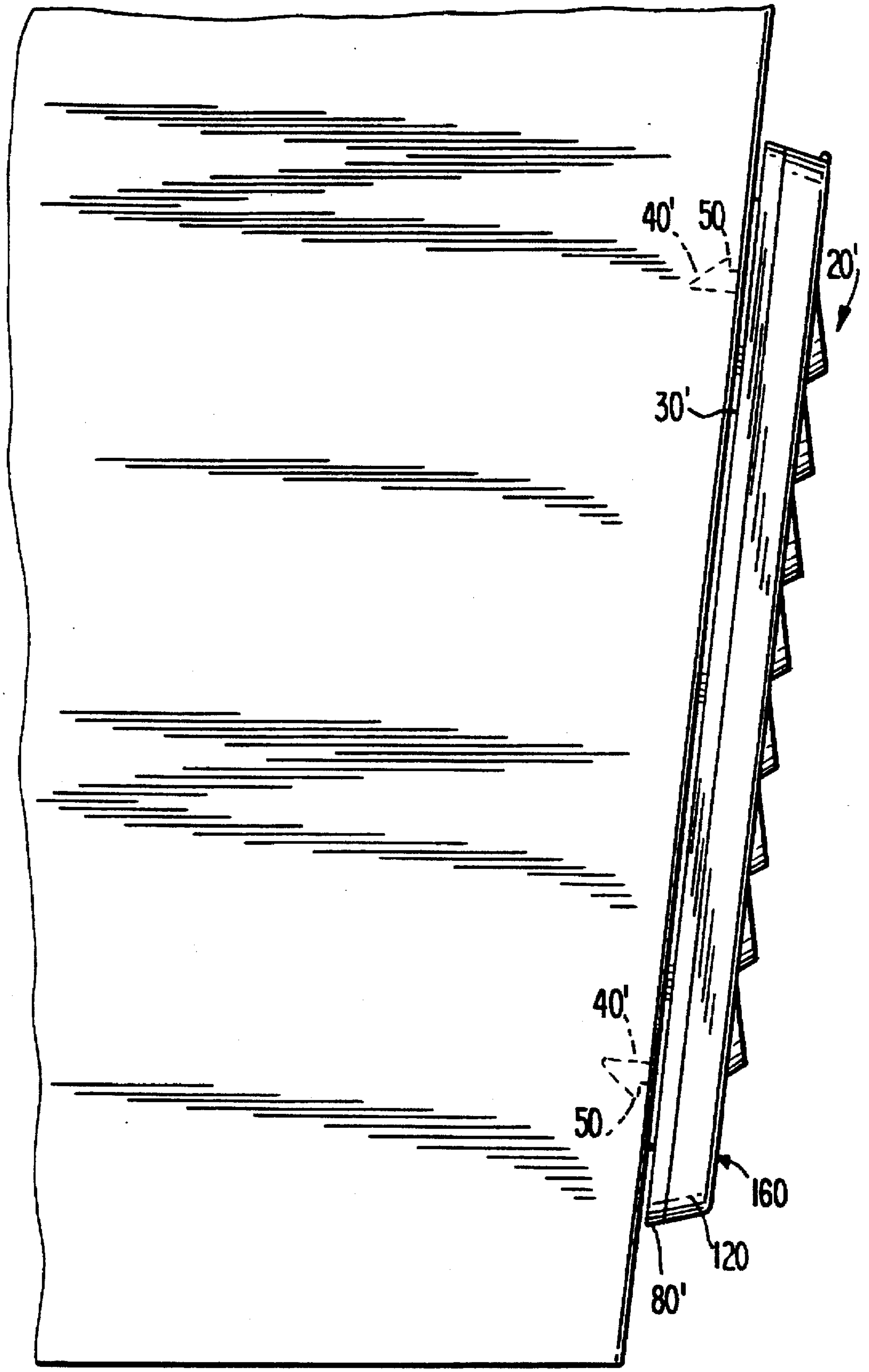
FIG. 5 is a view similar to FIG. 3 showing a different form of attachment of the secondary air filter assembly to the vacuum cleaner body.
Figure 15:
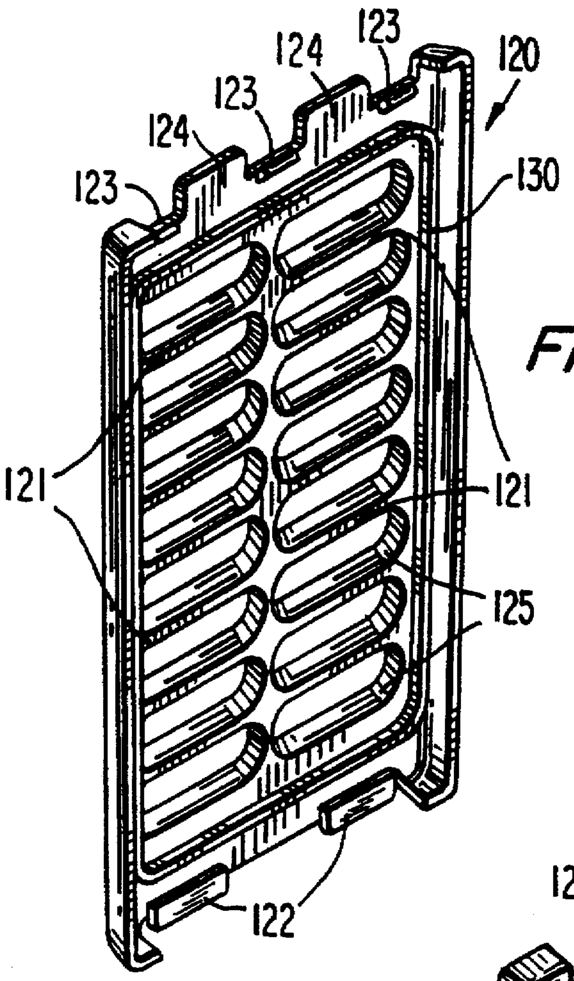
FIG. 15 is a rear perspective view of the filter carrier of FIGS. 12–14.

Along those lines, an alternative embodiment 20' of a secondary air filter assembly according to the present invention is shown in FIG. 5. Secondary air filter assembly 20' includes the same filter carrier 120 and filter 170 as secondary air filter assembly 20. However, adapter base 80 is replaced by adapter base 80', which is substantially identical to adapter base 80, except that alignment pegs 40 are replaced with alignment fingers 40' which, in addition to aligning adapter base 80' with exhaust port 104, also attach adapter base 80' to exhaust port 104 by engaging the edges of openings 105 with lips 50. Again, even if exhaust port 104 were one large opening, lips 50 could engage the edges of that one opening. This alternative embodiment has the advantage of being removable if desired, by manipulating fingers 40' from inside vacuum cleaner body 13. In this alternative embodiment, seal 30' is not a double-sided adhesive tape, but may be a single-sided closed-cell foam adhesive tape that is adhered to adapter base 80' or it may be a closed-cell foam gasket that is not adhered to adapter base 80' or it may be a gasket of rubber or other suitable material that may or may not be adhered to adapter base 80'.

Once adapter base 80 or adapter base 80' is affixed to vacuum cleaner body 13, it may be used as an adapter for attachments other than a secondary air filter. As discussed above, a fixture (not shown) could be attached to adapter base 80, 80' that has a fitting for attaching a vacuum cleaner hose. Such a fitting may or may not incorporate a secondary air filter. Other fixtures could be provided for performing any number of functions that can be accomplished using air under pressure.

Thus it is seen that an adapter or mount has been provided that allows a secondary air filter or other accessory to be attached to the exhaust port of an upright vacuum cleaner, especially a clean-air type upright vacuum cleaner. One skilled in the art will appreciate that the present invention can be practiced by other than the described embodiments, which are presented for purposes of illustration and not of limitation, and the present invention is limited only by the claims which follow.

What is claimed is:

1. An upright vacuum cleaner comprising:

a suction base; and a body, said body having therein a filter bag and a suction fan downstream of said filter bag, said suction fan drawing air through said filter bag for filtering dirt from said air, said body further having an exhaust port for exhausting air exiting from said suction fan, said upright vacuum cleaner further comprising an exhaust port adapter affixed to said exhaust port, said exhaust port adapter comprising:

a base mounted on said body over said exhaust port, said base having:

a releasable engagement structure for releasably attaching accessories to said exhaust port; and double-sided adhesive closed-cell foam tape for attaching said exhaust port adapter to said exhaust port, said foam tape surrounding said exhaust port and forming a seal between said exhaust port and said base for preventing air passing through said exhaust port from bypassing said exhaust port adapter.

2. The upright vacuum cleaner of claim 1 wherein:

said exhaust port comprises at least one exhaust port opening in said body, each said at least one exhaust port opening having at least one exhaust port edge; and said base further comprises a plurality of fingers for extending into said at least one exhaust port opening and engaging said at least one exhaust port edge.

3. The upright vacuum cleaner of claim 2 further comprising a respective lip on each of at least two of said plurality of fingers, each said lip lockingly engaging said at least one exhaust port edge.

4. The upright vacuum cleaner of claim 1 wherein said releasable engagement structure comprises at least one tab on one of said base and said accessory, and at least one slot on the other of said base and said accessory for interengaging with said tab.

5. The upright vacuum cleaner of claim 4 wherein at least one of said at least one tab comprises a lip for engaging an edge of at least one of said at least one slot.

6. Art upright vacuum cleaner comprising:

a suction base; and a body, said body having therein a suction fan and a filter bag for filtering dirt from air drawn in by said suction fan, said body further having an exhaust port for exhausting air exiting from said filter bag, said exhaust port comprising at least one exhaust port opening in said body, each said at least one exhaust port opening having at least one exhaust port edge, said upright vacuum cleaner further comprising an exhaust port adapter affixed to said exhaust port, said exhaust port adapter comprising:

a base mounted on said body over said exhaust port, said base having:

a plurality of guide projections for extending into said at least one exhaust port opening and engaging said at least one exhaust port edge;

a releasable engagement structure for releasably attaching accessories to said exhaust port; and double-sided adhesive closed-cell foam tape for attaching said exhaust port adapter to said exhaust port, said foam tape surrounding said exhaust port and forming a seal between said exhaust port and said base for preventing air passing through said exhaust port from bypassing said exhaust port adapter.

7. The upright vacuum cleaner of claim 6 further comprising a respective lip on each of at least two of said plurality of guide projections, each said lip lockingly engaging said at least one exhaust port edge.

8. The upright vacuum cleaner of claim 6 wherein said releasable engagement structure comprises at least one tab on one of said base and said accessory and at least one slot on the other of said base and said accessory for interengaging with said tab.

9. The upright vacuum cleaner of claim 8 wherein at least one of said at least one tab comprises a lip for engaging an edge of at least one of said at least one slot.

10. An exhaust port adapter for use with an upright vacuum cleaner comprising (a) a suction base, and (b) a body, said body having therein (1) a filter bag and (2) a suction fan downstream of said filter bag for drawing air through said filter bag for filtering dirt from said air, said body further having (3) an exhaust port for exhausting air exiting from said filter bag, said exhaust port comprising at least one exhaust port opening in said body, each said at least one exhaust port opening having at least one exhaust port edge, said exhaust port adapter comprising:

a base for mounting on said body over said exhaust port, said base having:

double-sided adhesive closed-cell foam tape for attaching said base to said exhaust port, said foam tape surrounding said exhaust port and forming a seal between said exhaust port and said base for preventing air passing through said exhaust port from bypassing said exhaust port adapter; and a releasable engagement structure for releasably attaching accessories to said exhaust port.

11. The exhaust port adapter of claim 10 further comprising a plurality of guide projections for extending into said at least one exhaust port opening and engaging said at least one exhaust port edge.

12. The exhaust port adapter of claim 11 further comprising a respective lip on each of at least two of said plurality of guide projections, each said lip lockingly engaging said at least one exhaust port edge.

13. The exhaust port adapter of claim 10 wherein said releasable engagement structure comprises at least one tab on one of said base and said accessory and at least one slot on the other of said base and said accessory for interengaging with said tab.

14. The exhaust port adapter of claim 13 wherein at least one of said at least one tab comprises a lip for engaging an edge of at least one of said at least one slot.

* * * * *

UNITED STATES PATENT AND TRADEMARK OFFICE
CERTIFICATE OF CORRECTION

PATENT NO : 5,690,713

DATED : November 25, 1997

INVENTOR(S) : Leonard E. Bowerman et al.

It is certified that error appears in the above-identified patent and that said Letters Patent is hereby corrected as shown below:

Col. 5, line 40, "the-base," should be -- the base, --.

Col. 6, line 15, "Welded" should be -- welded --.

Col. 7, line 7, "of" should be -- Of --.

Col. 9, line 59, "40'" should be -- 40', --.

Col. 10, line 4, "80'" should be -- 80', --.

Col. 10, line 66, "Art" should be -- An --.

Signed and Sealed this

Twenty-third Day of November, 1999

Attest:

Q. TODD DICKINSON

*Attesting Officer* *Acting Commissioner of Patents and Trademarks*